US012677004B2

(12) United States Patent
Wenger et al.

(10) Patent No.: US 12,677,004 B2
(45) Date of Patent: Jul. 7, 2026

(54) SEI MESSAGE FOR FILM GRAIN SYNTHESIS MASK

(71) Applicant: TENCENT AMERICA LLC, Palo Alto, CA (US)

(72) Inventors: Stephan Wenger, Hillsborough, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/895,486

(22) Filed: Sep. 25, 2024

(65) Prior Publication Data

US 2025/0106436 A1 Mar. 27, 2025

Related U.S. Application Data

(60) Provisional application No. 63/540,559, filed on Sep. 26, 2023.

(51) Int. Cl.
 *H04N 19/00* (2014.01)
 *H04N 19/70* (2014.01)
 *H04N 19/86* (2014.01)

(52) U.S. Cl.
 CPC ............. *H04N 19/70* (2014.11); *H04N 19/86* (2014.11)

(58) Field of Classification Search
 CPC ......... H04N 19/70; H04N 19/86; H04N 19/85
 See application file for complete search history.

(56) References Cited

U.S. PATENT DOCUMENTS

| | | | |
|---|---|---|---|
| 2014/0328574 A1 | 11/2014 | Sandberg et al. | |
| 2015/0172693 A1* | 6/2015 | Yang .................... | H04N 19/463 |
| | | | 375/240.26 |
| 2015/0195571 A1* | 7/2015 | Boyce .................... | H04N 19/36 |
| | | | 375/240.16 |
| 2019/0238877 A1* | 8/2019 | Sakurai .................. | H04N 19/46 |
| 2019/0261011 A1 | 8/2019 | Hannuksela | |

(Continued)

FOREIGN PATENT DOCUMENTS

| | | |
|---|---|---|
| WO | 2022/212792 A1 | 10/2022 |
| WO | 2023/275222 A1 | 1/2023 |

OTHER PUBLICATIONS

International Search Report and Written Opinion dated Nov. 19, 2024 in application No. PCT/US2024/048596.

(Continued)

*Primary Examiner* — Frank F Huang
(74) *Attorney, Agent, or Firm* — Sughrue Mion, PLLC

(57) ABSTRACT

A method and apparatus comprising computer code configured to cause a processor or processors to obtain video data including at least one coded picture; reconstruct a coded picture associated in the video data with a film grain characteristics SEI message, a first sample, a second sample, a third alpha map sample, and a fourth alpha map sample, wherein after reconstruction the first sample and the third alpha map sample, and the second sample and fourth sample are spatially co-located; apply film grain synthesis to the first sample based on a first value of the third sample; and determine to not apply film grain syntheses to the second sample based on a second value of the fourth sample, wherein the first value and second value are different from each other.

20 Claims, 9 Drawing Sheets

(56)     References Cited

U.S. PATENT DOCUMENTS

| | | | |
|---|---|---|---|
| 2020/0195946 A1 | 6/2020 | Choi et al. | |
| 2020/0204809 A1 * | 6/2020 | Ramasubramonian et al. | |
| 2020/0275129 A1 * | 8/2020 | Deshpande | H04N 19/186 |
| 2021/0400142 A1 * | 12/2021 | Jorasch | H04L 65/1069 |
| 2022/0124335 A1 | 4/2022 | Dinu et al. | |
| 2022/0283433 A1 * | 9/2022 | Christmas | G02B 27/0103 |
| 2023/0179805 A1 * | 6/2023 | He | H04N 19/117 |
| | | | 375/240.26 |

OTHER PUBLICATIONS

International Search Report and Written Opinion dated Dec. 23, 2024 in application No. PCT/US2024/048553.

* cited by examiner

701 — [8.5.2 Film grain characteristics SEI message semantics fg_blending_mode_id identifies the blending mode used to blend the simulated film grain with the input images as specified in Table 6. fg_blending_mode_id shall be in the range of 0 to 1, inclusive.

Figure 7:
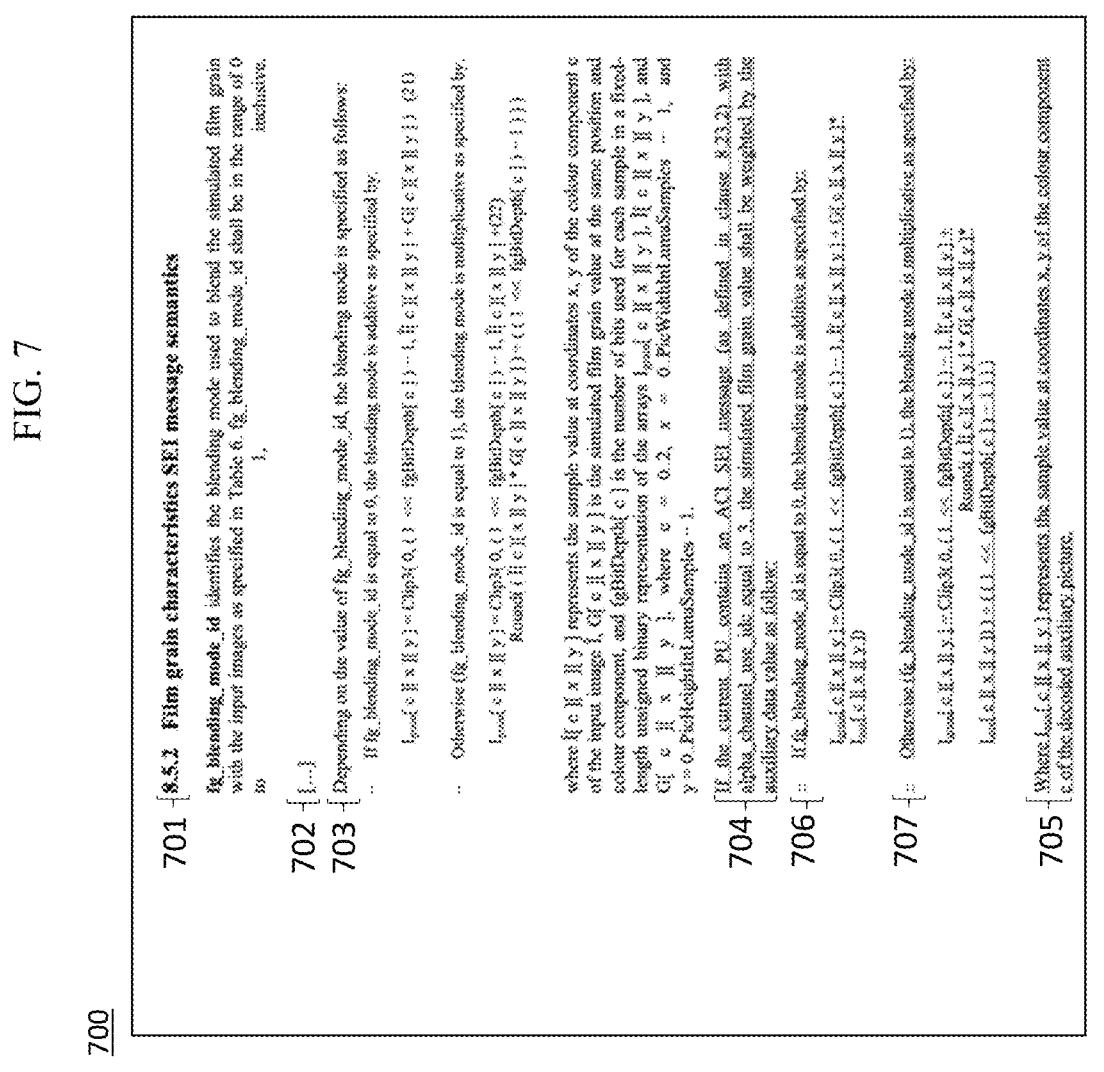

702 — […]

703 — Depending on the value of fg_blending_mode, the blending mode is specified as follows:
— If fg_blending_mode_id is equal to 0, the blending mode is additive as specified by:

$$I_{out}[c][x][y] = Clip3(0, (1 << fgBitDepth[c]) - 1, I_{in}[c][x][y] + G[c][x][y])$$ (20)

— Otherwise (fg_blending_mode_id is equal to 1), the blending mode is multiplicative as specified by:

$$I_{out}[c][x][y] = Clip3(0, (1 << fgBitDepth[c]) - 1, I_{in}[c][x][y] * G[c][x][y] >> (22)$$
$$Round(I_{in}[c][x][y] * G[c][x][y]) >> ((1 << fgBitDepth[c]) - 1)))$$

where I[c][x][y] represents the sample value at coordinates x, y of the colour component c of the input image I, G[c][x][y] is the simulated film grain value at the same position and colour component, and fgBitDepth[c] is the number of bits used for each sample in a fixed-length unsigned binary representation of the arrays I_{out}, I_{in} ∈ [c][x][y], G[c][x][y], Re [c][x][y], and G[c][x][y], where c = 0, 2, x = 0..PicWidthInLumaSamples - 1, and y = 0..PicHeightInLumaSamples - 1.

704 — [If the current PU contains an AC1 SEI message (as defined in clause 8.23.2) with alpha_channel_use_idc equal to 3, the simulated film grain value shall be weighted by the auxiliary data value as follow:

706 — [ If fg_blending_mode_id is equal to 0, the blending mode is additive as specified by:
$$I_{out}[c][x][y] = Clip3(0, (1 << fgBitDepth[c]) - 1, I_{in}[c][x][y] + G[c][x][y] * I_a[c][x][y])$$
$$I_a[c][x][y])$$

707 — [ Otherwise (fg_blending_mode_id is equal to 1), the blending mode is multiplicative as specified by:
$$I_{out}[c][x][y] = Clip3(0, (1 << fgBitDepth[c]) - 1, I_{in}[c][x][y] * I_a[c][x][y] *$$
$$Round(I_{in}[c][x][y] * G[c][x][y])$$
$$I_a[c][x][y][y] >> ((1 << fgBitDepth[c]) - 1)))$$

705 — [Where I_a[c][x][y] represents the sample value at coordinates x, y of the colour component c of the decoded auxiliary picture.

FIG. 8

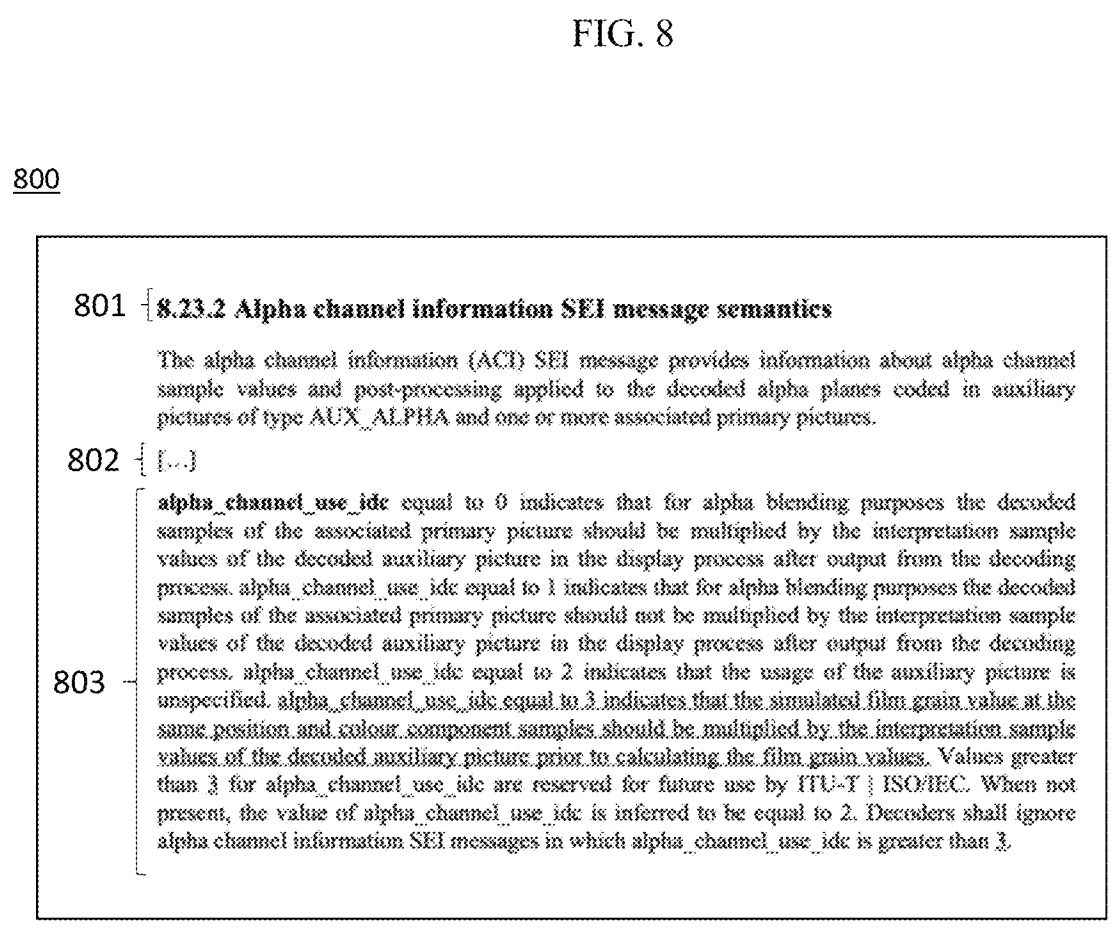

801 — 8.23.2 Alpha channel information SEI message semantics

The alpha channel information (ACI) SEI message provides information about alpha channel sample values and post-processing applied to the decoded alpha planes coded in auxiliary pictures of type AUX_ALPHA and one or more associated primary pictures.

802 — [...]

803 — alpha_channel_use_idc equal to 0 indicates that for alpha blending purposes the decoded samples of the associated primary picture should be multiplied by the interpretation sample values of the decoded auxiliary picture in the display process after output from the decoding process. alpha_channel_use_idc equal to 1 indicates that for alpha blending purposes the decoded samples of the associated primary picture should not be multiplied by the interpretation sample values of the decoded auxiliary picture in the display process after output from the decoding process. alpha_channel_use_idc equal to 2 indicates that the usage of the auxiliary picture is unspecified. alpha_channel_use_idc equal to 3 indicates that the simulated film grain value at the same position and colour component samples should be multiplied by the interpretation sample values of the decoded auxiliary picture prior to calculating the film grain values. Values greater than 3 for alpha_channel_use_idc are reserved for future use by ITU-T | ISO/IEC. When not present, the value of alpha_channel_use_idc is inferred to be equal to 2. Decoders shall ignore alpha channel information SEI messages in which alpha_channel_use_idc is greater than 3.

800

SEI MESSAGE FOR FILM GRAIN SYNTHESIS MASK

CROSS REFERENCE TO RELATED APPLICATION

This application claims priority to U.S. provisional application 63/540,559, filed on Sep. 26, 2023, the disclosure of which is incorporated herein by reference in its entirety.

BACKGROUND

1. Field

The disclosed subject matter relates to video coding and decoding, and more specifically, to the application of film grain or similar noises to a part of a picture, controlled by metadata including alpha or depth maps.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be described below.

Film Grain Synthesis (aka FGS) is a tool aimed at maintaining an impression of the original film grain, primarily for content shot using chemical films (in contrast to digital cameras) in a digital, compressed video environment. Digitized input material may be pre-filtered, which may remove the film grain but helps the following encoding step to achieve better compression efficiency compared to input material that includes noise such as film grain. An artificial approximation of film grain can get reinserted after reconstruction. The amount and characteristics of the noise can be part of a video bitstream in the form of metadata. ITU-T Rec. H.274, for example, includes a film grain characteristics SEI message.

ITU Rec. H.274 also includes an Alpha Channel information SEI message, which can be used to define the application of alpha channel information that may be present in an, for example H.266 bitstream.

SUMMARY

There is included a method and apparatus comprising memory configured to store computer program code and a processor or processors configured to access the computer program code and operate as instructed by the computer program code. The computer program is configured to cause the processor implement obtaining code configured to cause the at least one processor to obtain video data comprising at least one coded picture; reconstructing code configured to cause the at least one processor to reconstruct a coded picture associated in the video data with a film grain characteristics SEI message, a first sample, a second sample, a third alpha map sample, and a fourth alpha map sample, wherein after reconstruction the first sample and the third alpha map sample, and the second sample and first sample are spatially co-located; applying code configured to cause the at least one processor to apply film grain synthesis to the first sample based on a first value of the third sample; and determining code configured to cause the at least one processor to determine to not apply film grain syntheses to the second sample based on a second value of the fourth sample, wherein the first value and second value are different from each other.

The coded picture may be further associated in the video data with an alpha channel information SEI message which indicates the third alpha map sample and the fourth alpha map sample.

The alpha channel information SEI message may indicate alpha channel sample values and post-processing applied to decoded alpha planes coded in auxiliary pictures of type AUX_ALPHA and one or more associated primary pictures.

The alpha channel information SEI message may have a predetermined value that indicates that a simulated film grain value at a same position and color component sample is to be multiplied by interpretation sample values of a decoded auxiliary picture prior to calculating film grain values.

The value may be an integer that is 3.

The film grain characteristics SEI message may identify a blending mode used to blend simulated film grain with input images.

The grain characteristics SEI message may further identify a weighting of the film grain synthesis to by applied to the first sample.

BRIEF DESCRIPTION OF THE DRAWINGS

Further features, nature, and various advantages of the disclosed subject matter will be more apparent from the following detailed description and the accompanying drawings in which:

FIG. 5 is a simplified illustration of NAL unit and SEI headers in accordance with embodiments;

FIG. 7 is a schematic illustration of a modified film grain characteristics SEI message in accordance with an embodiment;

FIG. 8 is a schematic illustration of a modified alpha channel information SEI message in accordance with an embodiment.

DETAILED DESCRIPTION

Disclosed are techniques for a per-sample based application of Film Grain Synthesis using SEI messages.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Video signals today are often composed from multiple sources. For example, a movie with commentary may be composed of the movie content itself, and a surrounding frame with the commentary. The movie may have been shot using chemical film technology and hence, after digitization, may include film grain. To achieve reasonable compression, that film grain can be removed through pre-filtering. The surrounding frame, OTOH, was created by digital means and does not include film grain. After coding, transmission, and reconstruction, the resulting reconstructed pictures do not include the noise associated with film grain. That's preferable for the surrounding frame, but not for the movie, as here the film grain was removed through pre-filtering. Therefore, what is needed is a technique in which film grain can be selectively inserted in parts of a reconstructed picture while leaving the non-selected parts of the picture free of film grain. A more complex scenario may involve the inclusion of multiple movies with different film grain characteristics in a composed picture. In such a scenario, different film grain reinsertion parameters may advantageously be applied for different parts of the reconstructed picture.

Figure 1:
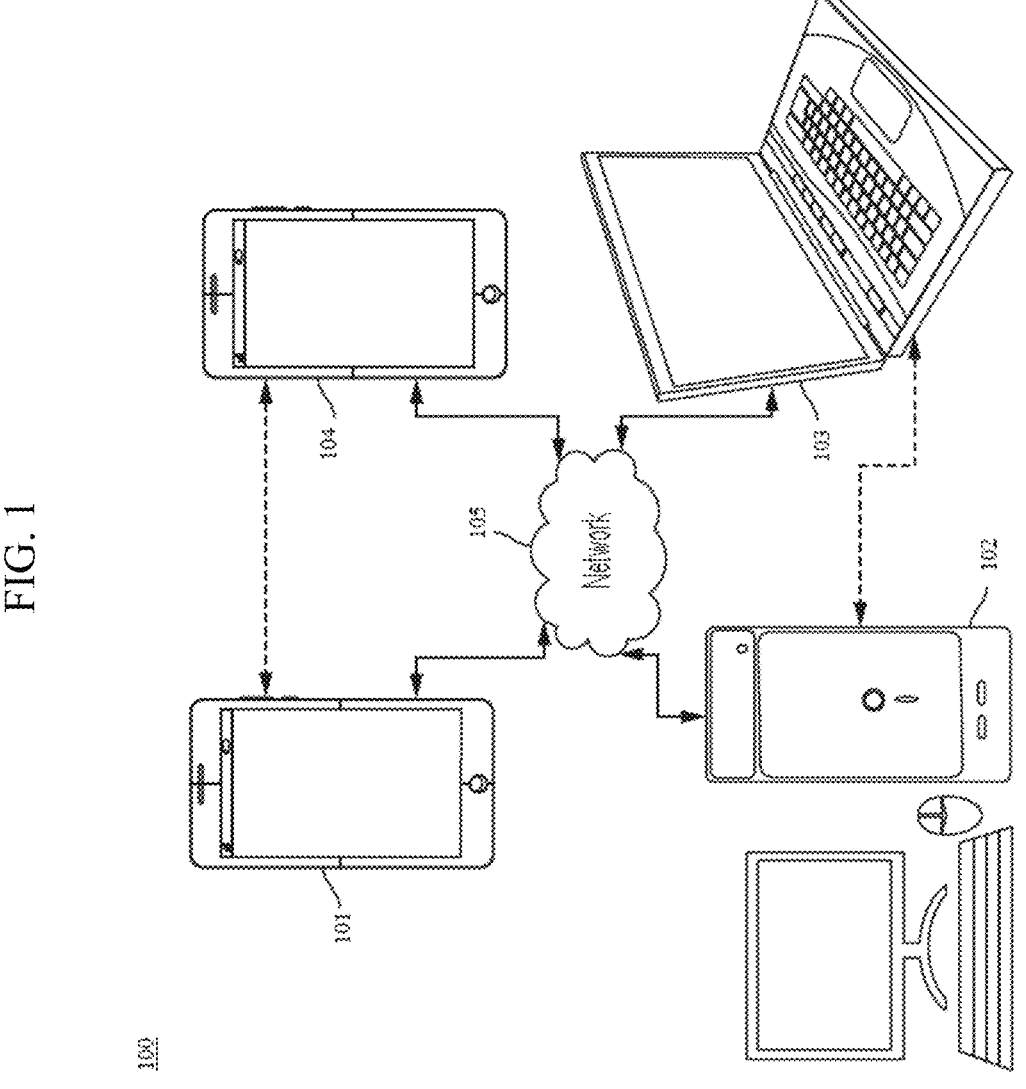
FIG. 1 is a schematic illustration of a computer environment in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105.

Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below. The network 105 may include Media Aware Network Elements (MANEs) that may be included in the transmission path between, for example, terminal 101 and 104. The purpose of a MANE may be selective forwarding of parts of the media data to react to network congestions, media switching, media mixing, archival, and similar tasks commonly performed by a service provider rather than an end user. Such MANEs may be able to parse and react on a limited part of the media conveyed over the network, for example syntax elements related to the network abstraction layer of video coding technologies or standards.

Figure 2:
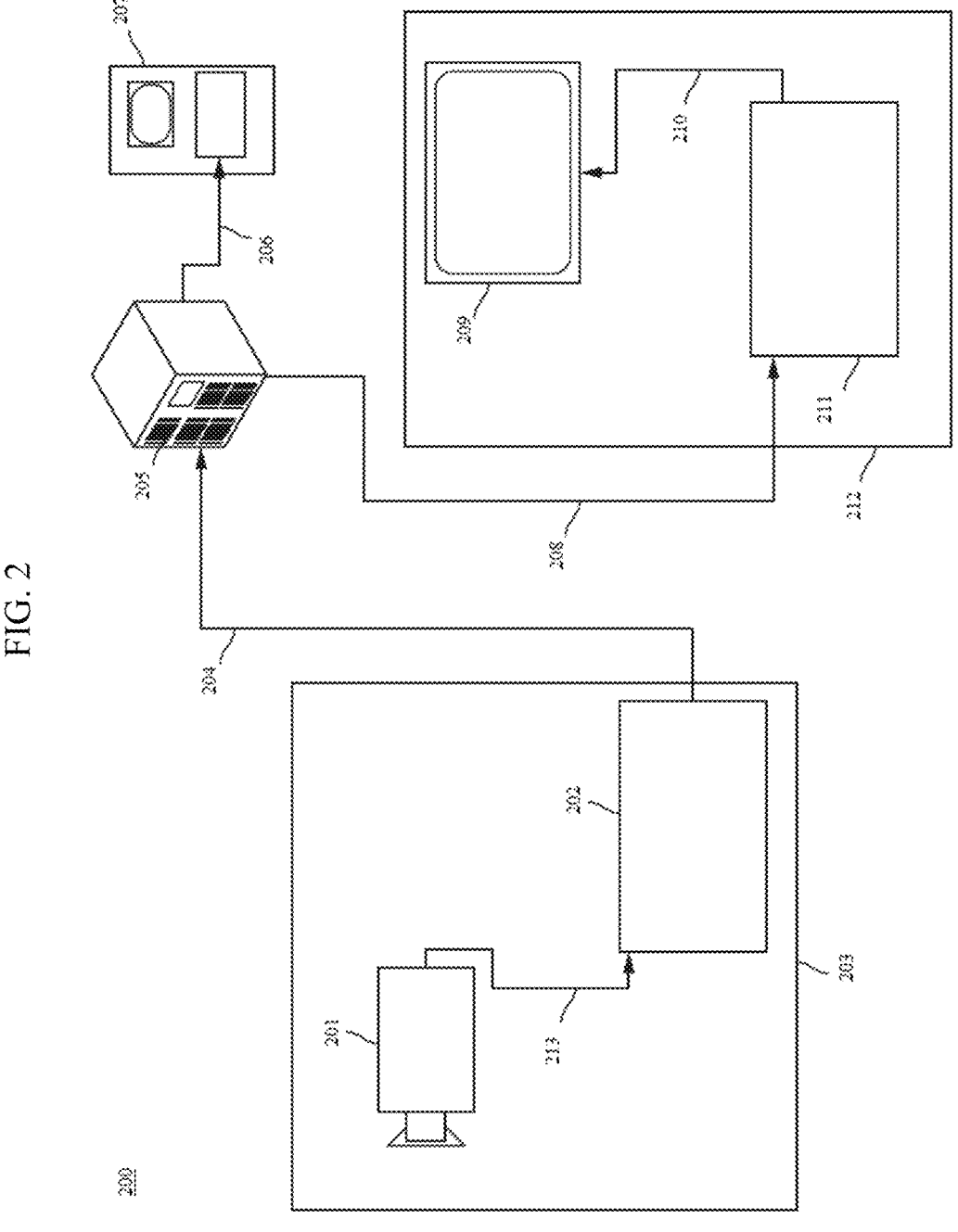
FIG. 2 is a simplified block diagram of media processing in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein. Examples of those standards include ITU-T Recommendations H.265 and H.266. The disclosed subject matter may be used in the context of VVC.

Figure 3:
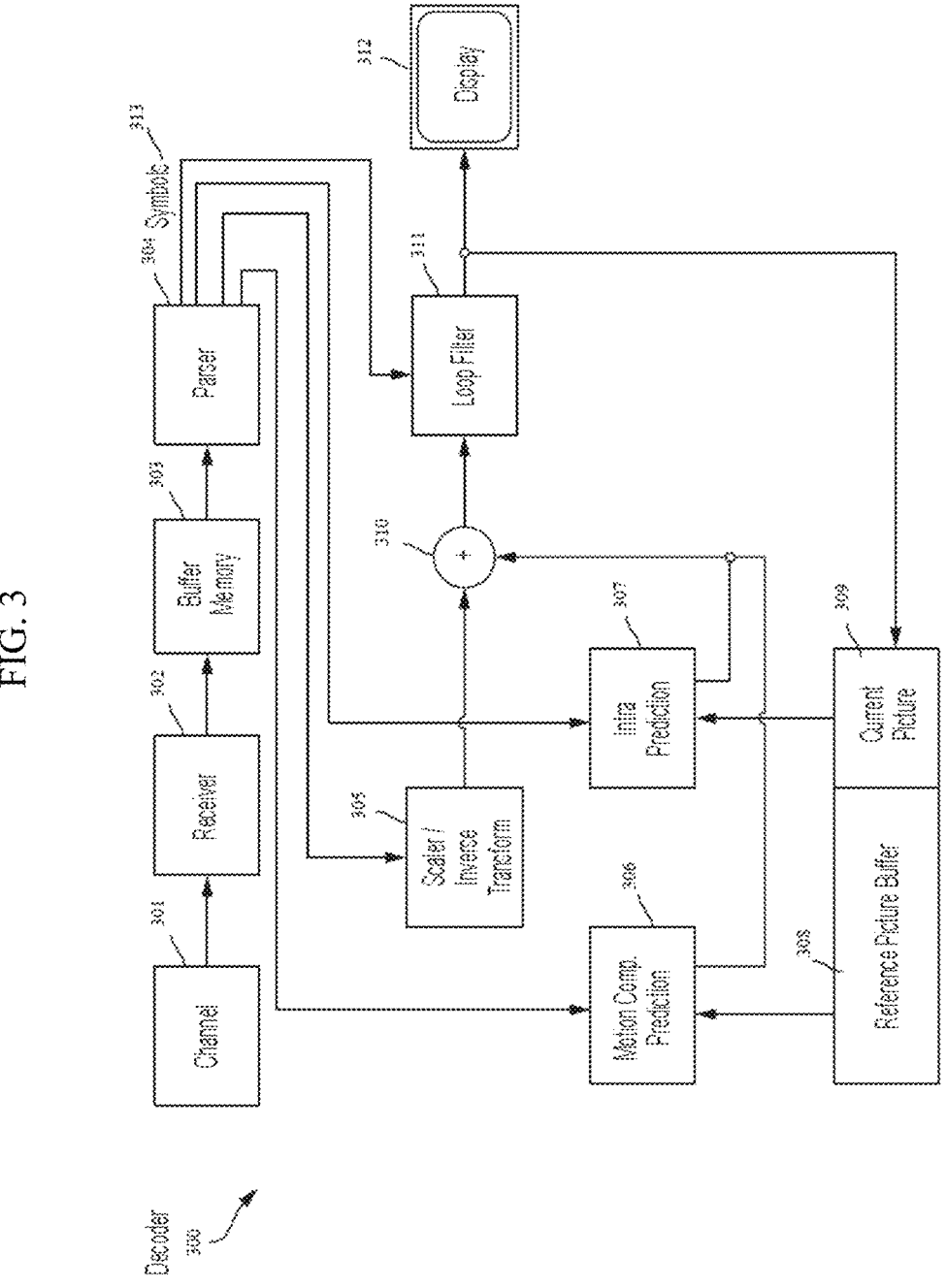
FIG. 3 is a simplified illustration of decoding in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.266. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
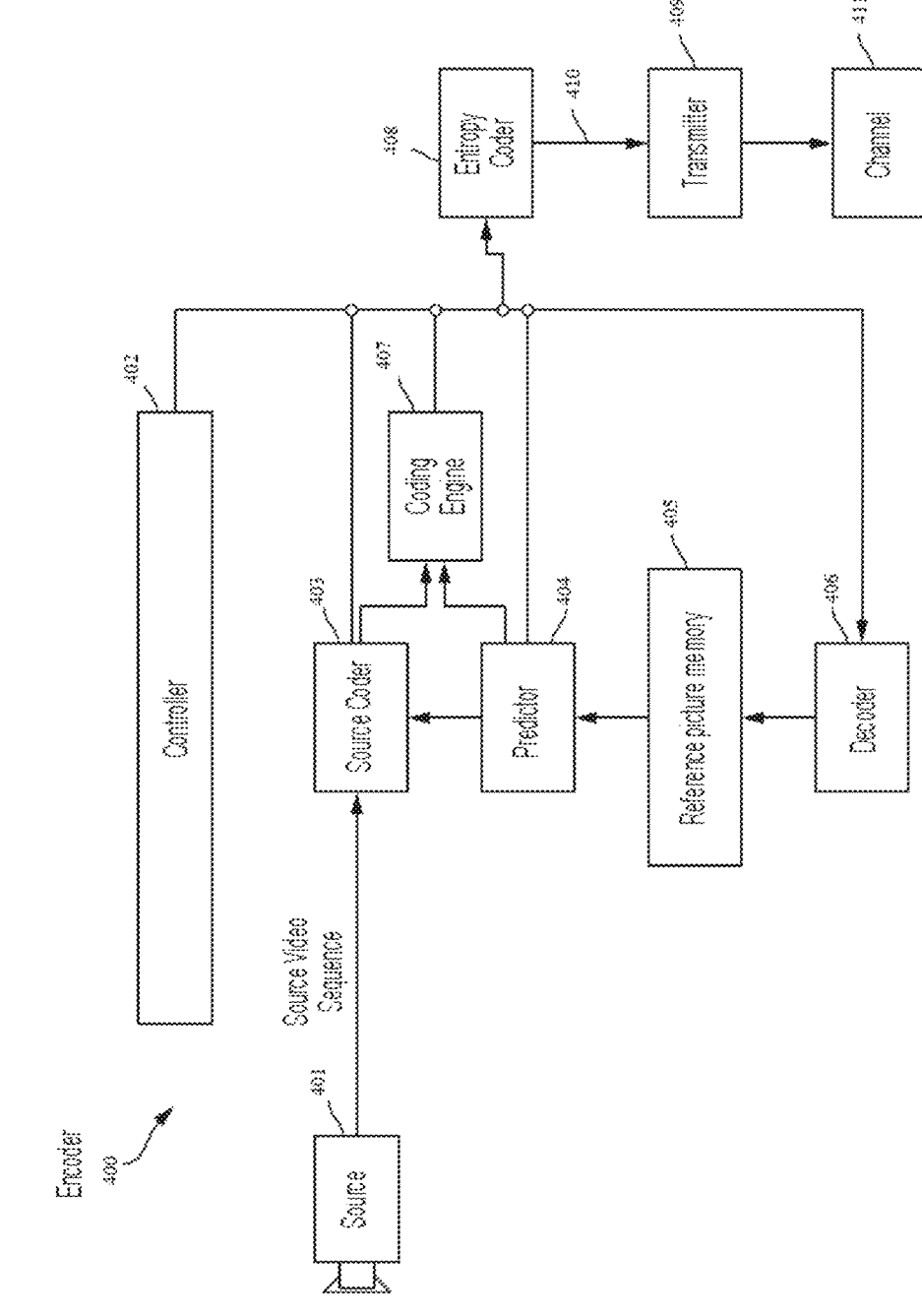
FIG. 4 is a simplified illustration of encoding in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 400 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405, which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the source coder 403, which may be for example a video coder, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the source coder 403 with other data to be transmitted, for example, coded audio data and/or ancillary data streams (sources not shown).

The controller 402 may manage operation of the encoder 400. During coding, the controller 402 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 400, which may be for example a video coder, may perform coding operations according to a predetermined video coding technology or standard, such as ITU-T Rec. H.266. In its operation, the encoder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

Figure 5:
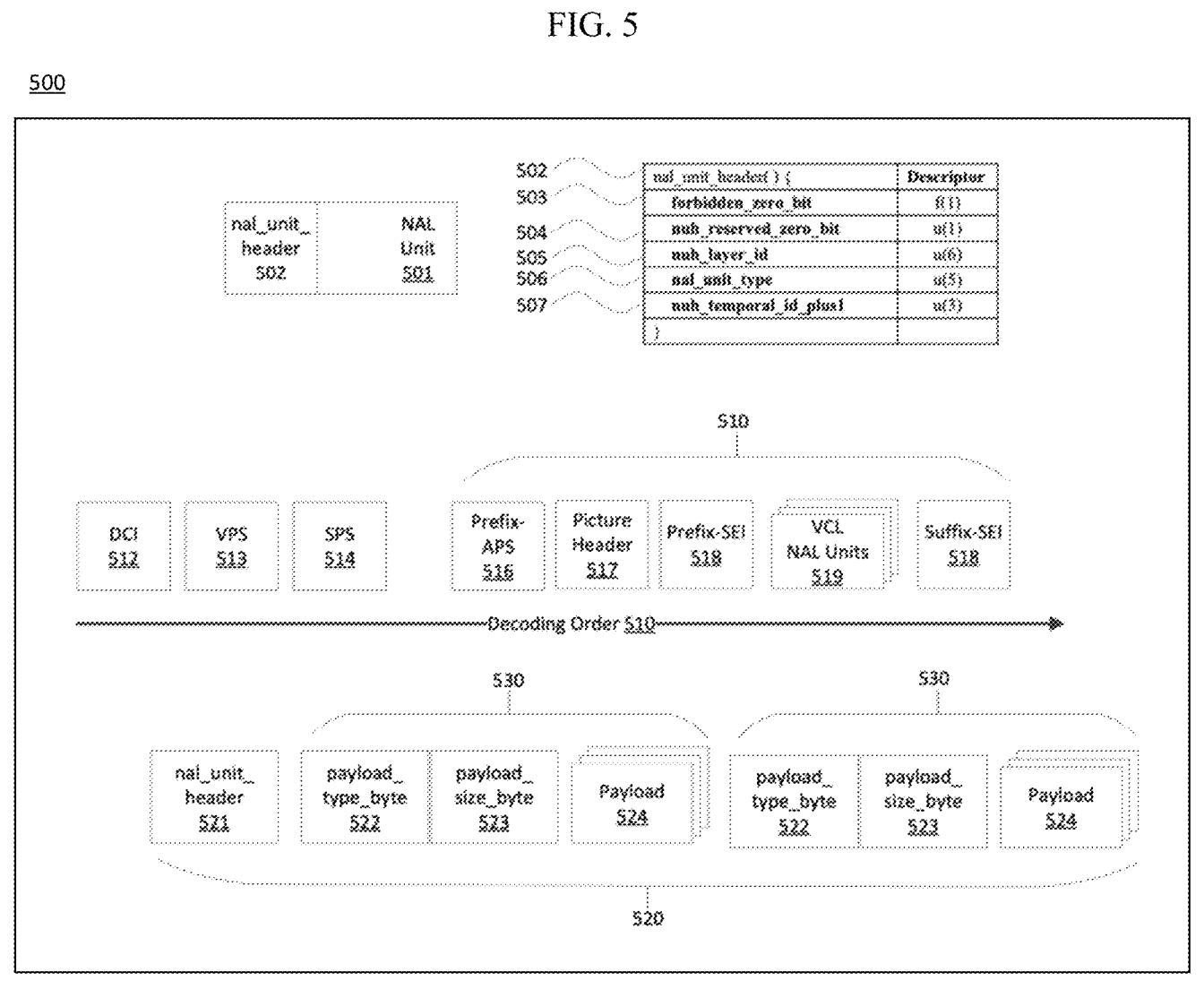

Referring to the example 500 of FIG. 5, shown is an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multiview enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plus1 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer. Using H.266 as an example, they can be categorized into (1) Parameter sets, (2) Picture Header (PH_NUT), (3) NAL units, (4) Prefix and Suffix SEI Nal unit types (PREFIX_SEI_NUT and SUFFIX_SEI_NUT), (5) Filler Data NAL unit type FD_NUT, and (6) Reserved and Unspecified NAL unit types, as follows.

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. In H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Still referring to FIG. 5, shown is a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use (here: H.266): a Prefix APS 516, Picture header (PH) 517, prefix SEI 518, one or more VCL NAL units 519, and suffix SEI 520.

Prefix and suffix SEI NAL units 518 and 520 were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516. On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Still referring to FIG. 5, show is a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

Figure 6:
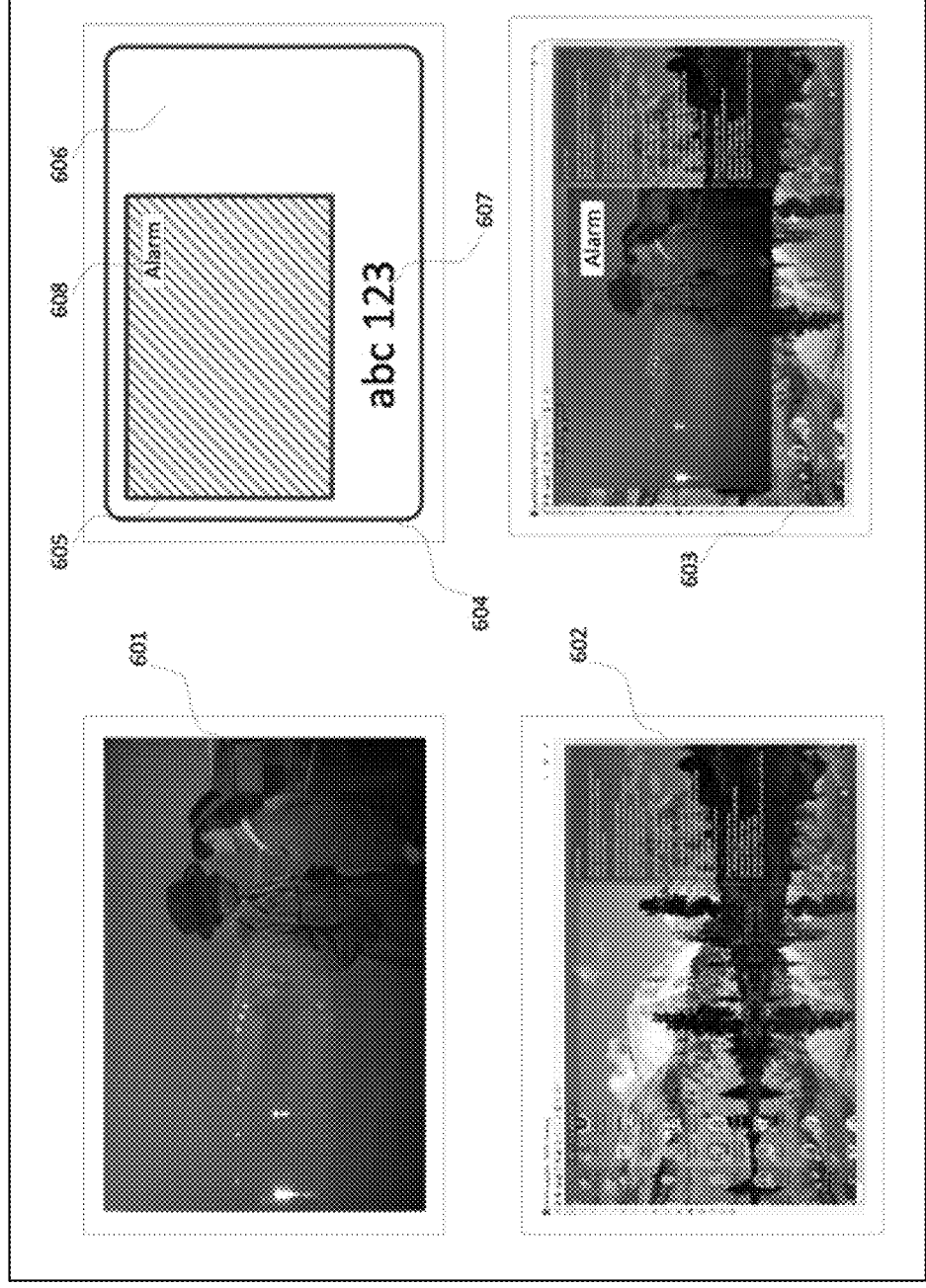
FIG. 6 is a schematic illustration of a video scene including movie content where film grain synthesis is desirable and computer generated content where it is not, in accordance with an embodiment.

Referring to example 600 of FIG. 6, shown is a still image taken from a black and white movie shot on chemical film 601. The light conditions in this particular shot are unfavorable (night shot), hence a lot of film grain is observable when watching the original film content, and, today, it is desirable to reproduce that film grain as it is directly associated with the original content and may even be part of the original artistic expression. In contrast, a computer screen shot 602 relies on sharp, noise-free information so to represent, for example, the small letters on the right sidebar. That the potentially noisy mountain scenery in the background may be not faithfully represented is, in this use case, acceptable.

Now consider a hybrid of the two contents in the same screen layout 603 and potentially in the same video stream. Parts of the content benefit from film grain, whereas other parts such as the letters on the right side bar, do not.

This is shown without distracting detail in screen shot 604. The movie images 605 benefit the reapplication of film grain, whereas the background 606 and in particular areas of high spatial computer-generated detail such as the string 607 do not benefit from film grain. Note that a screen layout may also include a window labelled "Alarm" 608 partially obscuring the displayed movie 605. That window is depicted as a rectangle but in modern systems could be in any shape. It is shown here to emphasize that indicating the movie area 605 through a rectangle coded as metadata, for example through its corner coordinates, may not be sufficient to identify the screen area where film grain processing is desirable. Other scenarios where non-rectangular (or non-uniform) areas need to be identified where film-grain processing may be desirable are readily observable by a person skilled in the art. For example, consider a scene showing a room with a TV playing the movie, where the TV is located at an angle to the parallax of the viewer. A sample-by-sample based solution for indicating film grain is desirable.

Using a per-sample mask to identify film grain could also be useful for, for example:

For artistic intent (focus on the faces of people) inviting the viewer to pay more attention to particular zones in the pictures (producers used to play with narrow depth of view, blurring the background)

To revive the textures such as the grass on the football pitch, particularly helpful when frame interpolation is used in a TV set (the film grain would maintain the detail perception)

To provide realism on videoconferencing scenarios on faces/skin only (if grain is applied on the entire image, it would look old style video: it could also be an issue if there are screen content in it)

Synthetic objects from special effects in movie production may have too soft textures, in this case this film grain mask would be used as a post-production tool such as a plug-in for Apple Final Cut Pro or DaVinci Resolve.

Video games have cinematics animations that would benefit from local application of film grain.

To control the exposure and the contrast by applying a higher film grain to shadows and highlights.

To limit the perception of visual artefacts in a picture.

Briefly referring to FIG. 2, consider an application scenario where in the sending system 203 the content source 201 is not an actual camera, but an image composer that puts together a video sequence 202 that covers a scene comparable to what is shown as the composed scene 603. In other words, the signal that is presented to the encoder 202 is a composed scene where parts benefit from de-noising and film-grain identification and coding in the form of metadata such as an SEI message, and other parts do not. Such an encoded stream may be conveyed 204, 208, potentially through a server 205 to a receiving system 212 and the decoder 211 located therein. The receiving system can decode the metadata identifying the samples that require film grain processing, and apply it to the reconstructed bitstream 210 through a post-processing step.

To summarize the above use case discussion, what is needed is:

1. A mechanism to identify one or more samples of a reconstructed coded pictures to which film-grain processing should be applied for the best user experience. Such samples may be representable by rectangular regions but may also be of a more complex shape. Further, it may make sense to apply a) different film grain properties to different samples, and/or b) apply film grain at a different strength for different samples.
2. A mechanism to describe film grain characteristics.
3. A mechanism to bind together the two mechanisms described above, in that the sample selection/strength mechanism applies to film grain.

Re 1: Sample selection mechanisms are readily available in video coding standards and related metadata standards. As examples, an "annotated region" SEI may be available which may allow to annotate a region of a picture, identified by its four corners, with metadata that can be processed by a renderer. Another option can be the use of an alpha map. An alpha map can be a reconstructed picture with a single plane, that can serve, in the present case, as a boolean or integer value for each corresponding sample of the reconstructed picture. Alpha panes can have the same spatial dimension as the reconstructed picture, or they can have a different size in which case they may be up/downscaled to map each sample of a reconstructed picture to a sample (or the filtered composite of multiple samples) of the alpha plane.

Re 2: VSEI specifies a film grain SEI message, and similar information can be available in the VUI of video coding specifications.

Re 3: No such binding is currently available in video coding or metadata specifications.

In an embodiment, an alpha map is used to indicate whether film grain processing should be applied to a spatially corresponding sample of a reconstructed picture. Assuming that the alpha plane's sample values are 10 bit integers with a value range of 0 to 1023 (as they would be when using H.266), alpha plane values below 512 could indicate that film grain synthesis should not be applied, whereas values above 511 could indicate that film grain synthesis should be applied. Such an alpha map can compress very well—possibly into a handful of bytes—for scenarios such as the one associated with picture layout 608.

In an embodiment, an alpha map could follow similar design principles as described above, but could include integer values instead of integer-coded Boolean values. The value of the integer can, for each sample, indicate the strength of the application of film grain.

Referring to the example 700 of FIG. 7, in order to identify the alpha map as the mechanism to indicate the use or strength of film grain on a per-sample basis, the H.274 existing Alpha Channel Information (ACI) SEI message can be modified as follows:

1. The Syntax remains unchanged
2. In the semantics of the Film Grain Synthesis information SEI, a paragraph is inserted as shown in FIG. 7 that modifies the FGS blending based on alpha channel information.
3. In the semantics of the Alpha Channel information SEI, a paragraph is inserted as shown in FIG. 8 so to introduce a previously reserved value of "3" and associate it with the use of the alpha map for file grain synthesis.

Referring to FIG. 7, shown is an excerpt of the semantics definition of the Film grain characteristics SEI message modified in accordance with an embodiment. The modifications are shown by underlined text. Certain parts of the semantics were deleted for clarity and are represented by "[ . . . ]" 702. For the most parts, the semantics remain unchanged 703. However, if the current picture unit (PU) contains an Alpha Channel Control indication with a (newly defined) value of "3" 704, then the blending equations change so that the alpha channel sample value Iaux[ ][ ][ ]705 is factored in (additive or multiplicative 706, 707.

In the same or another embodiment, referring to example 800 of FIG. 8, the Alpha Channel Control SEI 801 is shown with certain parts omitted for clarity 802. Underlined text indicates added/modified content vis-à-vis the published H.274 specification.

A new value "3" for alpha_channel_use_idc is introduced. Its semantics are that, when found, the sample values in the reconstructed auxiliary picture (which is the standard's word for alpha map in this context) are used for film grain synthesis. Specifically, when a value equal to 3 is found, that may indicate that the simulated film grain value at the same position and color component samples should be multiplied by the interpretation sample values of the decoded auxiliary picture prior to calculating the film grain values.

In an embodiment, rather than extending previously existing alpha channel information to add a new mode, a new type of SEI message may be generated specifically for the purpose of masking regions within a picture where film grain is applicable. The new type of SEI message may include a syntax element (e.g., fgs_aux_weighting_idc) indicating whether simulated film grain values at the same position and color component samples should be weighted by a weighting factor as determined based on the associated auxiliary picture. For example, when the value of fgs_aux_weighting_idc equals to 0, the simulated film grain values at the same position and color component samples are not weighted by a weighting factor as determined based on the associated auxiliary picture. On the other hand, if the value of fgs_aux_weighting_idc equals to 1, the simulated film grain values at the same position and color component samples are not weighted by a weighting factor as determined based on the associated auxiliary picture. Specifically, the simulated film grain values at the same position and color component samples in the picture may be multiplied by the interpretation sample values of the decoded auxiliary picture prior to calculating the film grain values.

In one embodiment, if the current PU contains the new type of SEI message, the simulated film grain value shall be weighted by the auxiliary data value as follow:

If fg_blending_mode_id is equal to 0, the blending mode is additive as specified by:

$$Igrain[c][x][y] =$$
$$Clip3(0, (1 \ll fgBitDepth[c]) - 1, \hat{I}[c][x][y] + G[c][x][y] * Iaux[c][x][y])$$

Otherwise (fg_blending_mode_id is equal to 1), the blending mode is multiplicative as specified by:

$$Igrain[c][x][y] = Clip3(0, (1 \ll fgBitDepth[c]) - 1, \hat{I}[c][x][y] +$$
$$Round((\hat{I}[c][x][y] * G[c][x][y] * Iaux[c][x][y])) \div ((1 \ll fgBitDepth[c]) - 1)))$$

where Iaux[c][x][y] represents the sample value at coordinates x, y of the colour component c of the decoded auxiliary picture.

Film Grain Synthesis (aka FGS) is a tool aimed at maintaining the original film grain while preserving the encoding efficiency due to its random nature and complexity. While being used to maintain the artistic intent or to mitigate visual artefacts, film grain is not seen relevant for the entire sequence or even within an image. Aspects of this contribution addresses the film grain synthesis applied locally on a per image basis by using the auxiliary data as a mask.

Film grain is well known feature originated from the small particles of silver-halide crystals on the film that became easy to recognize as a movie artistic specificity. The film grain effect also gives to games a cinematic feel by simulating the grainy visuals that are present in some movies. It creates realism if used softly and locally where it has value for the viewer. In such a case those artificial imperfections make synthetic contents more realistic. Finally, film grain may also be used to soften the visual artefacts incurred in the capture process or during the compression of the video signal.

In many cases, the film grain provides a certain level of realism only in some parts of the picture, for example on the skin texture, while keeping a soft background.

In its simplest approach the spatial adaptation of the film grain synthesis combines the calculated film grain values with a binary mask conveyed in the auxiliary data. In this case each film grain value is applied as is or not at all in the image.

Another approach is to use the mask to define weighting factors following the CTU structure of the main picture and apply more film grain in areas with a lower frequency.

An alternate approach, still relying on the same process is to use a mask with weighting factors on the film grain values. Such a mask may be a depth map transmitted as auxiliary data for 3D rendering purposes. In such a scenario, the film grain is applied to forefront objects while the background remains unchanged. This configuration is often used to increase the depth perception.

The film grain characteristics SEI message has been defined to synthetize the grain of the content without encoding it. Today, it lacks the spatial adaptation to the image.

The VSEI specification also specifies the Alpha Channel Information (ACI) SEI messages that defines how to combine the auxiliary data with the output image for alpha blending.

The ACI SEI message has 2 defined modes in alpha_channel_use_idc: mode 0: multiplicative and mode 1: non multiplicative. A 3rd mode (mode 3, since mode 2 is set to "unspecified") can be defined as the multiplicative use of the auxiliary data with the corresponding simulated film grain, defined by the Film Grain characteristics SEI message.

While interpreting the film grain characteristics SEI message, if the ACI SEI message is also present for the same picture with alpha_channel_use_idc equal to 3, then the associated auxiliary picture is used as a weighting factor of the film grain values.

The following clause depicts the impacted changes on the VSEI specification.

fg_blending_mode_id identifies the blending mode used to blend the simulated film grain with the input images as specified in Table 6. fg_blending_mode_id shall be in the range of 0 to 1, inclusive. The values of 2 and 3 for fg_blending_mode_id are reserved for future use by ITU TIISO/IEC and shall not be present in bitstreams conforming to this version of this Specification. Decoders shall ignore film grain characteristic SEI messages with fg_blending_mode_id equal to 2 or 3.

Depending on the value of fg_blending_mode_id, the blending mode is specified as follows:

If fg_blending_mode_id is equal to 0, the blending mode is additive as specified by:

$$I_{grain}[c][x][y] =$$ 
$$Clip3(0, (1 \ll fgBitDepth[c]) - 1, \hat{I}[c][x][y] + G[c][x][y])$$

Eq. (1)

Otherwise (fg_blending_mode_id is equal to 1), the blending mode is multiplicative as specified by:

$$I_{grain}[c][x][y] = Clip3(0, (1 \ll fgBitDepth[c]) - 1, \hat{I}[c][x][y] +$$
$$Round((\hat{I}[c][x][y] * G[c][x][y]) \div ((1 \ll fgBitDepth[c]) - 1)))$$

Eq. (2)

where $\hat{I}[c][x][y]$ represents the sample value at coordinates x, y of the colour component c of the input image $\hat{I}$, G[c][x][y] is the simulated film grain value at the same position and colour component, and fgBitDepth[c] is the number of bits used for each sample in a fixed-length unsigned binary representation of the arrays $I_{grain}[c][x][y]$, $\hat{I}[c][x][y]$, and G[c][x][y], where c=0 . . . 2, x=0 . . . PicWidthInLumaSamples−1, and y=0 . . . PicHeightInLumaSamples−1.

If the current PU contains an ACI SEI message (as defined in clause 8.23.2) with alpha_channel_use_idc equal to 3, the simulated film grain value shall be weighted by the auxiliary data value as follow:

If fg_blending_mode_id is equal to 0, the blending mode is additive as specified by:

$$I_{grain}[c][x][y] =$$

$$\text{Clip3}(0,\ (1 \ll fgBitDepth[c]) - 1,\ \hat{I}[c][x][y] + G[c][x][y] * I_{aux}[c][x][y])$$

Otherwise (fg_blending_mode_id is equal to 1), the blending mode is multiplicative as specified by:

$$I_{grain}[c][x][y] = \text{Clip3}\big(0,\ (1 \ll fgBitDepth[c]) - 1,\ \hat{I}[c][x][y] +$$

$$\text{Round}\big(\big(\hat{I}[c][x][y] * G[c][x][y] * I_{aux}[c][x][y]\big)\big) \div ((1 \ll fgBitDepth[c]) - 1)\big)$$

Where $I_{aux}[c][x][y]$ represents the sample value at coordinates x, y of the colour component c of the decoded auxiliary picture.

The alpha channel information (ACI) SEI message provides information about alpha channel sample values and post-processing applied to the decoded alpha planes coded in auxiliary pictures of type AUX_ALPHA and one or more associated primary pictures.

When a CVS does not contain an SDI SEI message with sdi_aux_id[i] equal to 1 for at least one value of i, no picture in the CVS shall be associated with an ACI SEI message.

When an AU contains both an SDI SEI message with sdi_aux_id[i] equal to 1 for at least one value of i and an ACI SEI message, the SDI SEI message shall precede the ACI SEI message in decoding order.

When an access unit contains an auxiliary picture picA in a layer, with nuh_layer_id equal to nuhLayerIdA, that is indicated as an alpha auxiliary layer by an SDI SEI message, the alpha channel sample values of picA persist in output order until one or more of the following conditions are true:

The next picture, in output order, with nuh_layer_id equal to nuhLayerIdA is output.

A CLVS containing the auxiliary picture picA ends.

The bitstream ends.

A CLVS of any associated primary layer of the auxiliary picture layer with nuh_layer_id equal to nuhLayerIdA ends.

The following semantics apply separately to each nuh_layer_id targetLayerId among the nuh_layer_id values to which the ACI SEI message applies.

alpha_channel_cancel_flag equal to 1 indicates that the SEI message cancels the persistence of any previous ACI SEI message in output order that applies to the current layer. alpha_channel_cancel_flag equal to 0 indicates that ACI follows.

Let currPic be the picture that the ACI SEI message is associated with. The semantics of ACI SEI message persist for the current layer in output order until one or more of the following conditions are true:

A new CLVS of the current layer begins.

The bitstream ends.

A picture in the current layer in an AU associated with an ACI SEI message is output that follows the current picture in output order.

alpha_channel_use_idc equal to 0 indicates that for alpha blending purposes the decoded samples of the associated primary picture should be multiplied by the interpretation sample values of the decoded auxiliary picture in the display process after output from the decoding process. alpha_channel_use_idc equal to 1 indicates that for alpha blending purposes the decoded samples of the associated primary picture should not be multiplied by the interpretation sample values of the decoded auxiliary picture in the display process after output from the decoding process. alpha_channel_use_idc equal to 2 indicates that the usage of the auxiliary picture is unspecified. alpha_channel_use_idc equal to 3 indicates that the simulated film grain value at the same position and colour component samples should be multiplied by the interpretation sample values of the decoded auxiliary picture prior to calculating the film grain values. Values greater than 3 for alpha_channel_use_idc are reserved for future use by ITU-T ISO/IEC. When not present, the value of alpha_channel_use_idc is inferred to be equal to 2. Decoders shall ignore alpha channel information SEI messages in which alpha_channel_use_idc is greater than 3.

Briefly referring again to FIG. 2, consider an application scenario where in the sending system 203 the content source 201 is not an actual camera, but an image composer that puts together a video sequence 202 that covers a scene comparable to what is shown as the composed scene 603. In other words, the signal that is presented to the encoder 202 is a composed scene where parts benefit from de-noising and film-grain identification and coding in the form of metadata such as an SEI message, and other parts do not. Such an encoded stream may be conveyed 204, 208, potentially through a server 205 to a receiving system 212 and the decoder 211 located therein. The receiving system can decode the metadata identifying the samples that require film grain processing, and apply it to the reconstructed bitstream 210 through a post-processing step.

To summarize the above use case discussion, what is needed is and provided by embodiments:

1. A mechanism to identify one or more regions of a reconstructed coded pictures to which film-grain processing should be applied for the best user experience. Such regions may be rectangular regions, but may overlap. Further, it may make sense to apply different film grain characteristics to different regions.

2. A mechanism to describe film grain characteristics.

3. A mechanism to bind together the two mechanisms described above, in that for a region requiring film grain the appropriate film grain characteristics (including potentially no film grain characteristics) can be appleid; that is, film grain can be synthesized in a post-processing step.

Re 1: An "annotated region" SEI (AR) is available in the VSEI specification, and video coding technologies not using VSEI—or in such cases where VSEI is available but not adequate for the application—a mechanism comparable to the AR can be devised by a person skilled in the art. Note that the AR can, among other things, specify multiple regions in an ordered list, and associate each region with a string chosen by the encoder.

Re 2: VSEI specifies a film grain SEI message (FGS), and similar information can be available in the VUI of video coding specifications. Multiple FGS messages may be in a picture unit (PU), and their order of appearance in the bitstream may be used by a decoder/receiver (211) to associate a given one of the multiple FGSs with one of the regions defined in the AR.

Re 3: Novel mechanisms are required to create a binding between one or more FGS and at one or more AR to associate film grain characteristic conveyed by a given FGS with a region defined in an AR.

A process that may be executed in the decoder could involve the following steps: The process would be, and according to embodiments is, the following:

```
Step 1: parameters initialization
   AnnotatedFgsLabelDefined= 0;              // Indicates if the FGS label is defined
   AnnotatedFgsLabelEnabledIdx = 0;            // Defines the index of the label
   corresponding to FGS-E.
   AnnotatedFgsLabelDisabledIdx = 0;           // Defines the index of the label
   corresponding to FGS-D.
   AnnotatedFgsObjectPresentFlag = 0;   // Indicates the presence of at least one annotated
                             region labelled with FGS.
Step 2: Scan the labels and look for the "FGS-E"
   for( i = 0; i < ar_num_label_updates; i++ ) {
      if (ar_label[ ar_label_idx[ i ] ] = "FGS-E") {
         AnnotatedFgsLabelDefined = 1                       // There is an
   FGS-E label defined
         AnnotatedFgsLabelEnabledIdx = ar_label_idx[ i ]          // Record the index in
   the label list
      }
      if (ar_label[ ar_label_idx[ i ] ] = "FGS-D") {
         AnnotatedFgsLabelDefined = 1                       // There is an
   FGS-D label defined
         AnnotatedFgsLabelDisabledIdx = ar_label_idx[ i ]        // Record the index in the
   label list
      }
   }
Step 3: Scan the objects and look for at least one annoted region labelled with FGS.
      for( i = 0; i < ar_num_object_updates; i++ ) {               // for each active
object
         if (ar_object_label_idx[ ar_object_idx[ i ] ] = AnnotatedFgsLabelEnabledIdx) {
            AnnotatedFgsObjectPresentFlag = 1          // at least one annotated
region for FGS found
         }
         if (ar_object_label_idx[ ar_object_idx[ i ] ] = AnnotatedFgsLabelDisabledIdx) {
            AnnotatedFgsObjectPresentFlag = 1          // at least one annotated
region for FGS found
         }
      }
Step 4: If at least one region(object) found with FGS, apply the simulated film grain values
to only the regions associated to FGS-E and FGS-D labels, and leave the image unchanged
for the rest. Otherwise the film grain synthesis is applied by default to the entire picture.
// for each sample and component
for (c = 0..2, x = 0..PicWidthInLumaSamples – 1, and y = 0..PicHeightInLumaSamples – 1) {
      If (AnnotatedFgsObjectPresentFlag = 1) {               // If there is at least one
annotated region for FGS
         I_grain[ c ][ x ][ y ] = Î[ c ][ x ][ y ]                      // First assume
there is no film grain applied
         for( i = 0; i < ar_num_object_updates; i++ ) {      // For each active region
            // If the region is labelled with FGS-E
            if (ar_object_label_idx[ ar_object_idx[ i ] ] =
AnnotatedFgsLabelEnabledIdx) {
               if ( // If [x;y] is within the bounding box
                  x >= ar_bounding_box_left[ ar_object_idx[ i ]] &&
               x < ar_bounding_box_left[ ar_object_idx[ i ] +
               ar_bounding_box_width[ ar_object_idx[ I ] &&
                  y >= ar_bounding_box_top[ ar_object_idx[ i ]] &&
               y < ar_bounding_box_top[ ar_object_idx[ i ] +
               ar_bounding_box_height[ ar_object_idx[ i ] ) {
               // apply FGS following the signalled blending mode
               if(fg_blending_mode_id = 0) // blending mode is additive
                  I_grain[ c ][ x ][ y ] = Clip3( 0, ( 1 << fgBitDepth[ c ] ) – 1, Î[ c ][ x ][ y ] +
               G[ c ][ x ][ y ])
               else // the blending mode is multiplicative
                  I_grain[ c ][ x ][ y ] = Clip3( 0, ( 1 << fgBitDepth[ c ] ) – 1, Î[ c ][ x ][ y ] +
               Round( ( Î[ c ][ x ][ y ] * G[ c ][ x ][ y ]) ) ÷ ( ( 1 << fgBitDepth[ c ] ) – 1 ) )
               )
                  } //endif inside the bouding box
               } //endif label index is FGS-E
            // If the region is labelled with FGS-D
            if (ar_object_label_idx[ ar_object_idx[ i ] ] =
AnnotatedFgsLabelDisabledIdx) {
               if ( // If [x;y] is within the bounding box
                  x >= ar_bounding_box_left[ ar_object_idx[ i ]] &&
               x < ar_bounding_box_left[ ar_object_idx[ i ] +
               ar_bounding_box_width[ ar_object_idx[ i ] &&
                  y >= ar_bounding_box_top[ ar_object_idx[ i ]] &&
               y < ar_bounding_box_top[ ar_object_idx[ i ] +
               ar_bounding_box_height[ ar_object_idx[ i ] ) {
               // Disable FGS
                  I_grain[ c ][ x ][ y ] = Î[ c ][ x ][ y ]
                  } //endif inside the bouding box
               } //endif label index is FGS-D
```

-continued

```
        } //end for each object
    } else { //there is no region with FGS-E label, apply the default FGS behaviour to the
entire picture
        if(fg__blending__mode__id = 0) // blending mode is additive
            I_grain[ c ][ x ][ y ] = Clip3( 0, ( 1 << fgBitDepth[ c ] ) − 1, Î[ c ][ x ][ y ] +
G[ c ][ x ][ y ])
        else // the blending mode is multiplicative
            I_grain[ c ][ x ][ y ] = Clip3( 0, ( 1 << fgBitDepth[ c ] ) − 1, Î[ c ][ x ][ y ] +
Round( ( Î[ c ][ x ][ y ] * G[ c ][ x ][ y ]) ) ÷ ( ( 1 << fgBitDepth[ c ] ) − 1) ) )
        }//endif FGS region present
} //end of each coordinate and each component
```

To summarize the above use case discussion, what is needed is and provided by embodiments is:

1. A mechanism to identify one or more samples of a reconstructed coded pictures to which film-grain processing should be applied for the best user experience. Such samples may be representable by rectangular regions but may also be of a more complex shape. Further, it may make sense to apply a) different film grain properties to different samples, and/or b) apply film grain at a different strength for different samples.

2. A mechanism to describe film grain characteristics.

3. A mechanism to bind together the two mechanisms described above, in that the sample selection/strength mechanism applies to film grain.

Also, for the 3.38.2 Film grain regions characteristics SEI message semantics according to exemplary embodiments, this SEI message provides the decoder with a parameterized model for a film grain synthesis process. The film grain synthesis process should be applied to the decoded pictures prior to their display. Use of this SEI message requires the definition of the following variables:

A picture width and picture height in units of luma samples, denoted herein by PicWidthInLumaSamples and PicHeightInLumaSamples, respectively.

When the syntax element rdf_separate_colour_description_present_flag of the film grain regions characteristics SEI message is equal to 0, the following additional variables:

A chroma format indicator, denoted herein by ChromaFormatIdc, as described in clause 7.3.

A bit depth for the samples of the luma component, denoted herein by BitDepthY, and when ChromaFormatIdc is not equal to 0, a bit depth for the samples of the two associated chroma components, denoted herein by BitDepthC.

The film grain models specified in the film grain regions characteristics SEI message are expressed for application to decoded pictures that have 4:4:4 colour format with luma and chroma bit depths corresponding to the luma and chroma bit depths of the film grain model and use the same colour representation domain as the identified film grain model. When the colour format of the decoded video is not 4:4:4 or the decoded video uses a different luma or chroma bit depth from that of the film grain model or uses a different colour representation domain from that of the identified film grain model, an unspecified conversion process is expected to be applied to convert the decoded pictures to the form that is expressed for application of the film grain model. Because the use of a specific method is not required for performing the film grain generation function used by the display process, a decoder could, if desired, down-convert the model information for chroma in order to simulate film grain for other chroma formats (4:2:0 or 4:2:2) rather than up-converting the decoded video (using a method not specified in this Specification) before performing film grain generation.

And according to embodiments, fgr_region_top[i], fgr_region_left[i], fgr_region_width[i], and fgr_region_height[i] specify the coordinates of the top-left corner and the width and height, respectively, of the bounding box of the i-th region in the picture.

The value of fgr_region_left[i] shall be in the range of 0 to PicWidthInLumaSamples−1, inclusive.

The value of fgr_region_top[i] shall be in the range of 0 to PicHeightInLumaSamples−1, inclusive.

The value of fgr_region_width[i] shall be in the range of 0 to PicWidthInLumaSamples−fgr_region_left[i], inclusive.

The value of fgr_region_height[i] shall be in the range of 0 to PicHeightInLumaSamples−fgr_region_top[i], inclusive.

The techniques, such as for SEI message for Film grain synthesis mask described above, described above, can be implemented as computer software using computer-readable instructions and physically stored in one or more computer-readable media or by a specifically configured one or more hardware processors. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
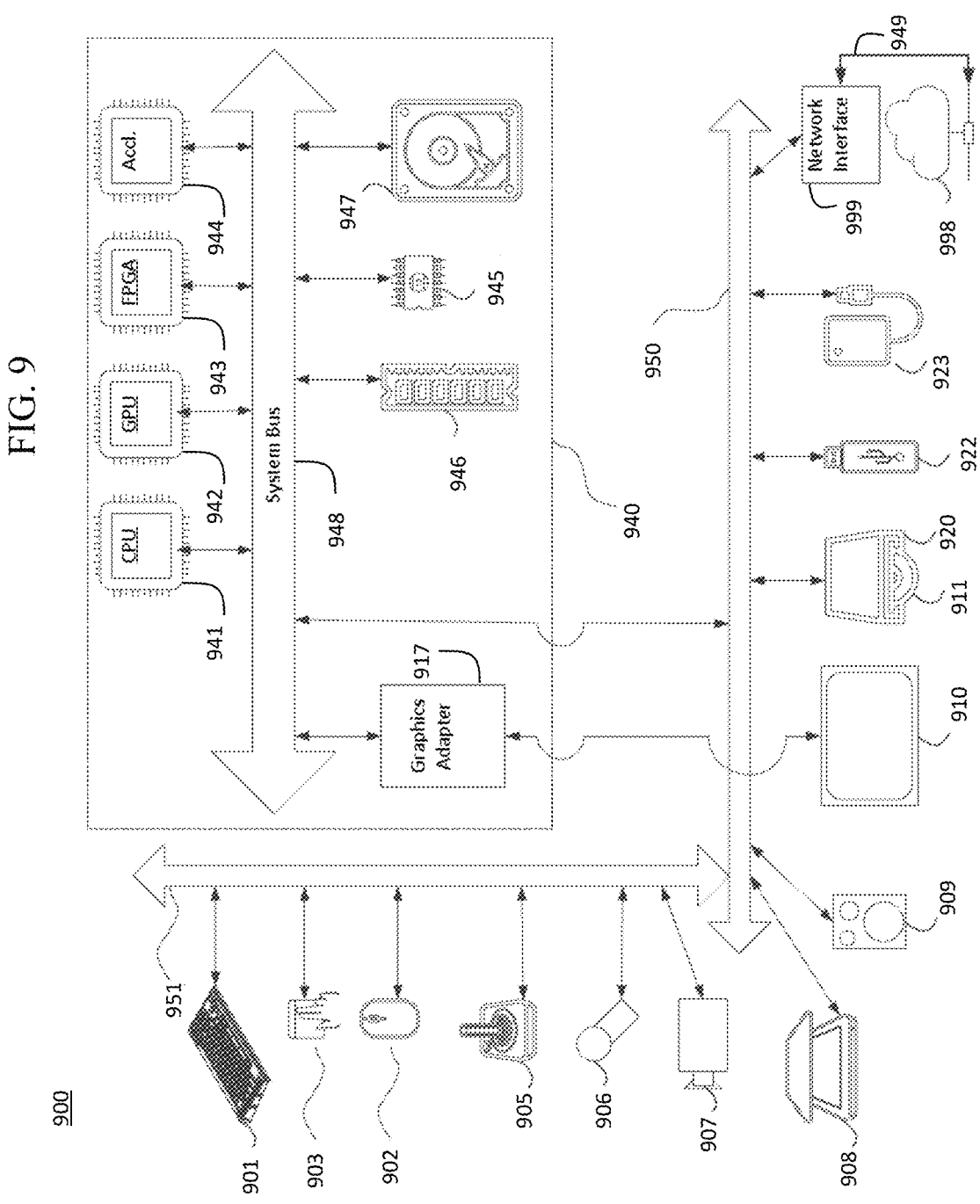
FIG. 9 is a schematic illustration of a computer system in accordance with embodiments.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, joystick 905, microphone 906, scanner 908, camera 907.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, or joystick 905, but there can also be tactile feedback devices that do not serve as input devices), audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD 911 or the like media, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface 999 to one or more communication networks 998. Networks 998 can for example be wireless, wireline, optical. Networks 998 can further be local, wide-area, metropolitan, vehicular and industrial, real-time, delay-tolerant, and so on. Examples of networks 998 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 998 commonly require external network interface adapters that attached to certain general-purpose data ports or peripheral buses (950 and 951) (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks 998, computer system 900 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, a graphics adapter 917, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieval to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method for video decoding, the method including: obtaining video data comprising at least one coded picture; reconstructing a coded picture associated in the video data with a film grain characteristics SEI message, a first sample, a second sample, a third alpha map sample, and a fourth alpha map sample, wherein after reconstruction the first sample and the third alpha map sample, and the second sample and fourth sample are spatially co-located; applying film grain synthesis to the first sample based on a first value of the third sample; and determining to not apply film grain syntheses to the second sample based on a second value of the fourth sample, wherein the first value and second value are different from each other.

(2) The method of feature (1), in which the coded picture is further associated in the video data with an alpha channel information SEI message which indicates the third alpha map sample and the fourth alpha map sample.

(3) The method of any of features (1) to (2), in which the alpha channel information SEI message indicates alpha channel sample values and post-processing applied to decoded alpha planes coded in auxiliary pictures of type AUX_ALPHA and one or more associated primary pictures.

(4) The method of any of features (1) to (3), in which the alpha channel information SEI message having a predetermined value indicates that a simulated film grain value at a same position and color component sample is to be multiplied by interpretation sample values of a decoded auxiliary picture prior to calculating film grain values.

(5) The method of any of features (1) to (4), in which the value is an integer that is 3.

(6) The method of any of features (1) to (5), in which the film grain characteristics SEI message identifies a blending mode used to blend simulated film grain with input images.

(7) The method of any of features (1) to (6), in which the grain characteristics SEI message further identifies a weighting of the film grain synthesis to by applied to the first sample.

(8) A method for video encoding, the method including: obtaining video data comprising at least one picture; and encoding the video data such that reconstructing the at least one picture comprises reconstructing the at least one picture as associated in the video data with a film grain characteristics SEI message, a first sample, a second sample, a third alpha map sample, and a fourth alpha map sample, wherein after reconstruction the first sample and the third alpha map sample, and the second sample and fourth sample are spatially co-located, wherein reconstructing the at least one picture further comprises applying film grain synthesis to the first sample based on a first value of the third sample and determining to not apply film grain syntheses to the second sample based on a second value of the fourth sample, wherein the first value and second value are different from each other.

(9) The method of feature (8), in which encoding the video data comprises associating the picture in the video data with an alpha channel information SEI message which indicates the third alpha map sample and the fourth alpha map sample.

(10) The method of any of features (8) to (9), in which the alpha channel information SEI message indicates alpha channel sample values and post-processing applied to decoded alpha planes coded in auxiliary pictures of type AUX_ALPHA and one or more associated primary pictures.

(11) The method of any of features (8) to (10), in which the alpha channel information SEI message having a predetermined value indicates that a simulated film grain value at a same position and color component sample is to be multiplied by interpretation sample values of a decoded auxiliary picture prior to calculating film grain values.

(12) The method of any of features (8) to (11), in which the value is an integer that is 3.

(13) The method of any of features (8) to (12) in which the film grain characteristics SEI message identifies a blending mode used to blend simulated film grain with input images.

(14) The method of any of features (8) to (13) in which the grain characteristics SEI message further identifies a weighting of the film grain synthesis to by applied to the first sample.

(15) A method of processing visual media data, the method including: performing a conversion between a visual media file and a bitstream of a visual media data according to a format rule indicating to reconstruct a coded picture associated in video data with a film grain characteristics SEI message, a first sample, a second sample, a third alpha map sample, and a fourth alpha map sample, wherein after reconstruction the first sample and the third alpha map sample, and the second sample and fourth sample are spatially co-located; apply film grain synthesis to the first sample based on a first value of the third sample; and determine to not apply film grain syntheses to the second sample based on a second value of the fourth sample, wherein the first value and second value are different from each other.

(16) The method of features (15), in which the coded picture is further associated in the video data with an alpha channel information SEI message which indicates the third alpha map sample and the fourth alpha map sample.

(17) The method of any of features (15) to (16), in which the alpha channel information SEI message indicates alpha channel sample values and post-processing applied to decoded alpha planes coded in auxiliary pictures of type AUX_ALPHA and one or more associated primary pictures.

(18) The method of any of features (15) to (17), in which the alpha channel information SEI message having a predetermined value indicates that a simulated film grain value at a same position and color component sample is to be multiplied by interpretation sample values of a decoded auxiliary picture prior to calculating film grain values.

(19) The method of any of features (15) to (18), in which the value is an integer that is 3.

(20) The method of any of features (15) to (19), in which the film grain characteristics SEI message identifies a blending mode used to blend simulated film grain with input images.

(21) An apparatus for video decoding, including processing circuitry that is configured to perform the method of any of features (1) to (7).

(22) An apparatus for video encoding, including processing circuitry that is configured to perform the method of any of features (8) to (15).

(23) A non-transitory computer-readable storage medium storing instructions which when executed by at least one processor cause the at least one processor to perform the method of any of features (1) to (20).

What is claimed is:

1. A method for video decoding, the method comprising:

obtaining video data comprising at least one coded picture;

reconstructing a coded picture associated in the video data with a film grain characteristics SEI message, a first sample, a second sample, a third alpha map sample, and a fourth alpha map sample, wherein after reconstruction the first sample and the third alpha map sample, and the second sample and the fourth alpha map sample are spatially co-located, the film grain characteristics SEI message comprises an "for region" syntax indicating:

any of partial and complete co-location of regions indicated by ones of the first sample, the second sample, the third alpha map sample, and the fourth alpha map sample, and each of an "fgr_region_left[i]" value, an "fgr_region_top[i]" value, an "fgr_region_width[i]" value, and an "fgr_region_height[i]" value, of which the "fgr_region_left[i]" value, the "fgr_region_top [i]" value, the "fgr_region_width[i]" value, and the "fgr_region_height[i]" value represent coordinates of a top-left corner and a width and height of a bounding box of an i-th region of the coded picture;

applying film grain synthesis to the first sample based on a first value of the third sample; and determining to not apply film grain syntheses to the second sample based on a second value of the fourth sample, wherein the first value and second value are different from each other.

2. The method according to claim 1, wherein the "fgr_region_left[i]" value represents a first range of 0 to a PicWidthInLumaSamples values minus 1, inclusive, the "fgr_region_top[i]" value represents a second range of 0 to a PicHeightInLumaSamples value minus 1, inclusive, the "fgr_region_width[i]" value represents a third range of 0 to the PicWidthInLumaSamples value minus the "fgr_region_left[i]" value, and the "fgr_region_height[i]" value represents a fourth range of 0 to the PicHeightInLumaSamples minus the "fgr_region_top[i]" value, inclusive.

3. The method according to claim 1, wherein the coded picture is further associated in the video data with an alpha channel information SEI message which indicates the third alpha map sample and the fourth alpha map sample, and wherein the alpha channel information SEI message indicates alpha channel sample values and post-processing applied to decoded alpha planes coded in auxiliary pictures of type AUX_ALPHA and one or more associated primary pictures.

4. The method according to claim 1, wherein the coded picture is further associated in the video data with an alpha channel information SEI message which indicates the third alpha map sample and the fourth alpha map sample, and wherein the alpha channel information SEI message having a predetermined value indicates that a simulated film grain value at a same position and color component sample is to be multiplied by interpretation sample values of a decoded auxiliary picture prior to calculating film grain values.

5. The method according to claim 4, wherein the value is an integer that is 3.

6. The method according to claim 1, wherein the film grain characteristics SEI message identifies a blending mode used to blend simulated film grain with input images.

7. The method according to claim 6, wherein the grain characteristics SEI message further identifies a weighting of the film grain synthesis to by applied to the first sample.

8. A method for video encoding, the method comprising:

obtaining video data comprising at least one picture; and encoding the video data such that reconstructing the at least one picture comprises reconstructing the at least one picture as associated in the video data with a film grain characteristics SEI message, a first sample, a second sample, a third alpha map sample, and a fourth alpha map sample, wherein after reconstruction the first sample and the third alpha map sample, and the second sample and the fourth alpha map sample are spatially co-located, the film grain characteristics SEI message comprises an "for region" syntax indicating:

any of partial and complete co-location of regions indicated by ones of the first sample, the second sample, the third alpha map sample, and the fourth alpha map sample, and each of an "fgr_region_left[i]" value, an "fgr_region_top[i]" value, an "fgr_region_width[i]" value, and an "fgr_region_height[i]" value, of which the "fgr_region_left[i]" value, the "fgr_region_top [i]" value, the "fgr_region_width[i]" value, and the "fgr_region_height[i]" value represent coordinates of a top-left corner and a width and height of a bounding box of an i-th region of the coded picture;

wherein reconstructing the at least one picture further comprises applying film grain synthesis to the first sample based on a first value of the third sample and determining to not apply film grain syntheses to the second sample based on a second value of the fourth sample, wherein the first value and second value are different from each other.

9. The method according to claim 8, wherein the "fgr_region_left[i]" value represents a first range of 0 to a PicWidthInLumaSamples values minus 1, inclusive, the "fgr_region_top[i]" value represents a second range of 0 to a PicHeightInLumaSamples value minus 1, inclusive, the "fgr_region_width[i]" value represents a third range of 0 to the PicWidthInLumaSamples value minus the "fgr_region_left[i]" value, and the "fgr_region_height[i]" value represents a fourth range of 0 to the PicHeightInLumaSamples minus the "fgr_region_top[i]" value, inclusive.

10. The method according to claim 8, wherein encoding the video data comprises associating the picture in the video data with an alpha channel information SEI message which indicates the third alpha map sample and the fourth alpha map sample, and wherein the alpha channel information SEI message indicates alpha channel sample values and post-processing applied to decoded alpha planes coded in auxiliary pictures of type AUX_ALPHA and one or more associated primary pictures.

11. The method according to claim 8, wherein encoding the video data comprises associating the picture in the video data with an alpha channel information SEI message which indicates the third alpha map sample and the fourth alpha map sample, and wherein the alpha channel information SEI message having a predetermined value indicates that a simulated film grain value at a same position and color component sample is to be multiplied by interpretation sample values of a decoded auxiliary picture prior to calculating film grain values.

12. The method according to claim 11, wherein the value is an integer that is 3.

13. The method according to claim 8, wherein the film grain characteristics SEI message identifies a blending mode used to blend simulated film grain with input images.

14. The method according to claim 13, wherein the grain characteristics SEI message further identifies a weighting of the film grain synthesis to by applied to the first sample.

15. A method of encoding visual media data, the method comprising:

generating a bitstream of the visual media data according to a an encoding process comprising:

encoding a coded picture associated in video data with a film grain characteristics SEI message, a first sample, a second sample, a third alpha map sample, and a fourth alpha map sample, wherein after reconstruction the first sample and the third alpha map sample, and the second sample and the fourth alpha map sample are spatially co-located, the film grain characteristics SEI message comprises an "for region" syntax indicating:

any of partial and complete co-location of regions indicated by ones of the first sample, the second sample, the third alpha map sample, and the fourth alpha map sample, and each of an "fgr_region_left[i]" value, an "fgr_region_top[i]" value, an "fgr_region_width[i]" value, and an "fgr_region_height[i]" value, of which the "fgr_region_left[i]" value, the "fgr_region_top [i]" value, the "fgr_region_width[i]" value, and the "fgr_region_height[i]" value represent coordinates of a top-left corner and a width and height of a bounding box of an i-th region of the coded picture;

applying film grain synthesis to the first sample based on a first value of the third sample; and determining to not apply film grain syntheses to the second sample based on a second value of the fourth sample, wherein the first value and second value are different from each other.

16. The method according to claim 15, wherein the "fgr_region_left[i]" value represents a first range of 0 to a PicWidthInLumaSamples values minus 1, inclusive, the "fgr_region_top[i]" value represents a second range of 0 to a PicHeightInLumaSamples value minus 1, inclusive, the "fgr_region_width[i]" value represents a third range of 0 to the PicWidthInLumaSamples value minus the "fgr_region_left[i]" value, and the "fgr_region_height[i]" value represents a fourth range of 0 to the PicHeightInLumaSamples minus the "fgr_region_top[i]" value, inclusive.

17. The method according to claim 15, wherein the coded picture is further associated in the video data with an alpha channel information SEI message which indicates the third alpha map sample and the fourth alpha map sample, and wherein the alpha channel information SEI message indicates alpha channel sample values and post-processing applied to decoded alpha planes coded in auxiliary pictures of type AUX_ALPHA and one or more associated primary pictures.

18. The method according to claim 15, wherein the coded picture is further associated in the video data with an alpha channel information SEI message which indicates the third alpha map sample and the fourth alpha map sample, and wherein the alpha channel information SEI message having a predetermined value indicates that a simulated film grain value at a same position and color component sample is to be multiplied by interpretation sample values of a decoded auxiliary picture prior to calculating film grain values.

19. The method according to claim 18, wherein the value is an integer that is 3.

20. The method according to claim 15, wherein the film grain characteristics SEI message identifies a blending mode used to blend simulated film grain with input images.

* * * * *